(12) United States Patent
Schmidt

(10) Patent No.: US 7,057,518 B2
(45) Date of Patent: Jun. 6, 2006

(54) SYSTEMS AND METHODS FOR TESTING WIRELESS DEVICES

(76) Inventor: Dominik J. Schmidt, 580 Arastradero Rd., Palo Alto, CA (US) 94306

( * ) Notice: Subject to any disclaimer, the term of this patent is extended or adjusted under 35 U.S.C. 154(b) by 88 days.

(21) Appl. No.: 09/887,908

(22) Filed: Jun. 22, 2001

(65) Prior Publication Data

US 2002/0196029 A1 Dec. 26, 2002

(51) Int. Cl.
*G08B 21/00* (2006.01)
(52) U.S. Cl. .................. 340/635; 324/765; 324/500
(58) Field of Classification Search ........... 340/635, 340/634; 324/765, 500, 754, 764, 601, 605; 714/733, 734, 30, 736, 25, 46, 41
See application file for complete search history.

(56) References Cited

U.S. PATENT DOCUMENTS

| 5,682,472 | A | | 10/1997 | Brehm et al. |
| 5,751,633 | A | | 5/1998 | Hsia et al. |
| 5,847,951 | A | * | 12/1998 | Brown et al. ............... 363/147 |
| 5,966,025 | A | * | 10/1999 | Beffa ........................... 324/765 |
| 5,986,282 | A | * | 11/1999 | Seki ............................ 257/48 |
| 6,002,375 | A | * | 12/1999 | Corman et al. ............. 343/853 |
| 6,058,497 | A | * | 5/2000 | Tuttle ......................... 714/733 |
| 6,137,303 | A | * | 10/2000 | Deckert et al. ............. 324/765 |
| 6,236,223 | B1 | * | 5/2001 | Brady et al. ................ 324/765 |
| 6,412,086 | B1 | * | 6/2002 | Friedman et al. ........... 714/733 |

* cited by examiner

*Primary Examiner*—Anh V. La

(57) ABSTRACT

Systems and methods are disclosed for parallel testing one or more wireless devices using a single wireless command, each device including a processor and memory coupled to the processor. The system includes a tester adapted to exercise the wireless devices, including: a transceiver adapted to communicate with each wireless device; and a computer coupled to the transceiver, the computer adapted to test all wireless devices in parallel by issuing a single test command using a wireless signal, the computer adapted to store test patterns and test results.

20 Claims, 4 Drawing Sheets

SYSTEMS AND METHODS FOR TESTING WIRELESS DEVICES

This application is related to co-pending application Ser. No. 09/887,905 entitled "CLOCK GENERATION SYSTEMS AND METHODS," filed concurrently herewith and commonly assigned, the content of which is hereby incorporated by reference.

BACKGROUND

The present invention relates systems and methods for testing semiconductor devices in wireless communication devices.

The production of high value devices such as wireless communication integrated circuits (ICs) used in cellular telephones and walkie-talkies requires many sophisticated processes. The actual number of processing steps required varies upon the type and complexity of the circuit being built. One design trend is to place as many systems as practicable on a single IC called a system on integrated circuit (SOIC). Components fabricated on these SOIC devices typically include processors, memory devices such as random access memory (RAM) devices and non-volatile memory devices such as FLASH memory, and analog devices such as transceivers, among others.

After fabrication, the dies of each wafer are separated into individual chips for mounting and connection in a package. The mounting and connecting (bonding) steps are expensive and can approach or exceed the cost of fabrication. To avoid wasteful packaging, a test to identify nonfunctioning chips is performed during an operation known as wafer sort (also known as die sort or electrical test). Once tested, the ICs are mounted in a package and connected to the "outside" world via package connections.

The testing of each component in the IC can be complex, expensive and time-consuming. For example, for random access memory devices, a predetermined test pattern sequence is used to test each cell in the memory. The pattern may include any number of steps, each step consisting of a number of read/write sequences. A typical test method initially writes a first value to a memory cell to be tested. The test then reads that memory cell to verify that the value is stored in the memory cell. The test then writes a second value to the memory cell, where the second value is the complement of the first value. Storage of the second value is then verified. If the memory cell fails any step within the test method, the memory device is considered defective.

For flash memory testing, in order to write data into the memory, the write operation may have to be repeated multiple times on the same address. The manufacturer of the flash memory device typically specifies a maximum number of times that the operation may be repeated in order to imprint the data in the memory. If the number of repeated operations reaches this maximum without succeeding in writing the data during testing, then the device is deemed defective.

As discussed in U.S. Pat. No. 5,682,472 to Brehm, et al., a typical flash memory test system connects each flash device to its own chip select pin that enables or disables the device from recognizing any operation that is being performed on it. Each chip select pin allows several successive cycles of input to command the device to write, verify, or read. The data to be written onto the address follows the command. The entire sequence would need to be repeated for each address up to the maximum number of iterations specified. Since each device is coupled to its own chip select pin, typically only one flash memory device is operated on at one point in time per chip select pin. Additionally, because there is one signal line for each pad, and each die is connected to the tester through a complex set of probe-pins, the process of testing is necessarily serial, with one die tested at a time. Because only one chip is enabled at one point in time, the testing process can be time consuming and costly, taking more than a minute for large memory sizes.

Typically, external testers such as automatic test equipment (ATE) are used during production to test of these devices. To illustrate, at the time of filing the instant application, a typical FLASH memory for wireless application has a capacity of about sixteen megabits. Testing each cell requires approximately twenty seconds, and with special patterns and disturb tests the test can take more than one minute. In one exemplary estimate for testing cost, a typical device tester costs approximately $200,000 and depreciates in four years. Assuming 50% uptime and utilization percentage, the cost per die is approximately $0.20. These tests have to be repeated after burn-in and after packaging, so that the final cost can be as high as $0.75/die. Since the silicon cost of the die is typically $0.50 to $5, testing cost can be a significant component of the value of the device.

SUMMARY

Systems and methods are disclosed for parallel testing one or more wireless devices using a single wireless command, each device including a processor and memory coupled to the processor. The system includes a tester adapted to exercise the wireless devices, including: a transceiver adapted to communicate with each wireless device; and a computer coupled to the transceiver, the computer adapted to test all wireless devices in parallel by issuing a single test command using a wireless signal, the computer adapted to store test patterns and test results. This system is made possible through the concept of system-on-chip (SoC) where several elements (FLASH memory, I/O, CPU, analog circuits) are combined on a single chip. Today, several vendors are selling low-power single chip radio frequency (RF) devices which can be integrated onto larger SoC designs. This approach is particularly well suited to wireless chips, since an RF circuit is needed there anyway. Also, with the advent of low-power, high-sensitivity radios, it is possible to combine the radio with a microprocessor on the same chip without causing interference. For example, Bluetooth, a wireless radio protocol, works with as little as 1 mW, which does not disturb any surrounding micro-circuits. These radios are typically built with a software protocol stack, and it is advantageous to have this protocol stack be present on the chip. Such an on-chip memory capability is typically achieved using embedded FLASH processes.

Advantages of the system may include one or more of the following. The system minimizes waste and rework on the final product by assuring the quality and proper operation of the wireless IC devices, rejecting those that do not respond to the radio query. The embedded FLASH memory is tested on several die at once, significantly cutting down on the test time and cost. The complexity of the test equipment and the probe-card is significantly reduced by using the air interface instead of an expensive probe-card arrangment.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
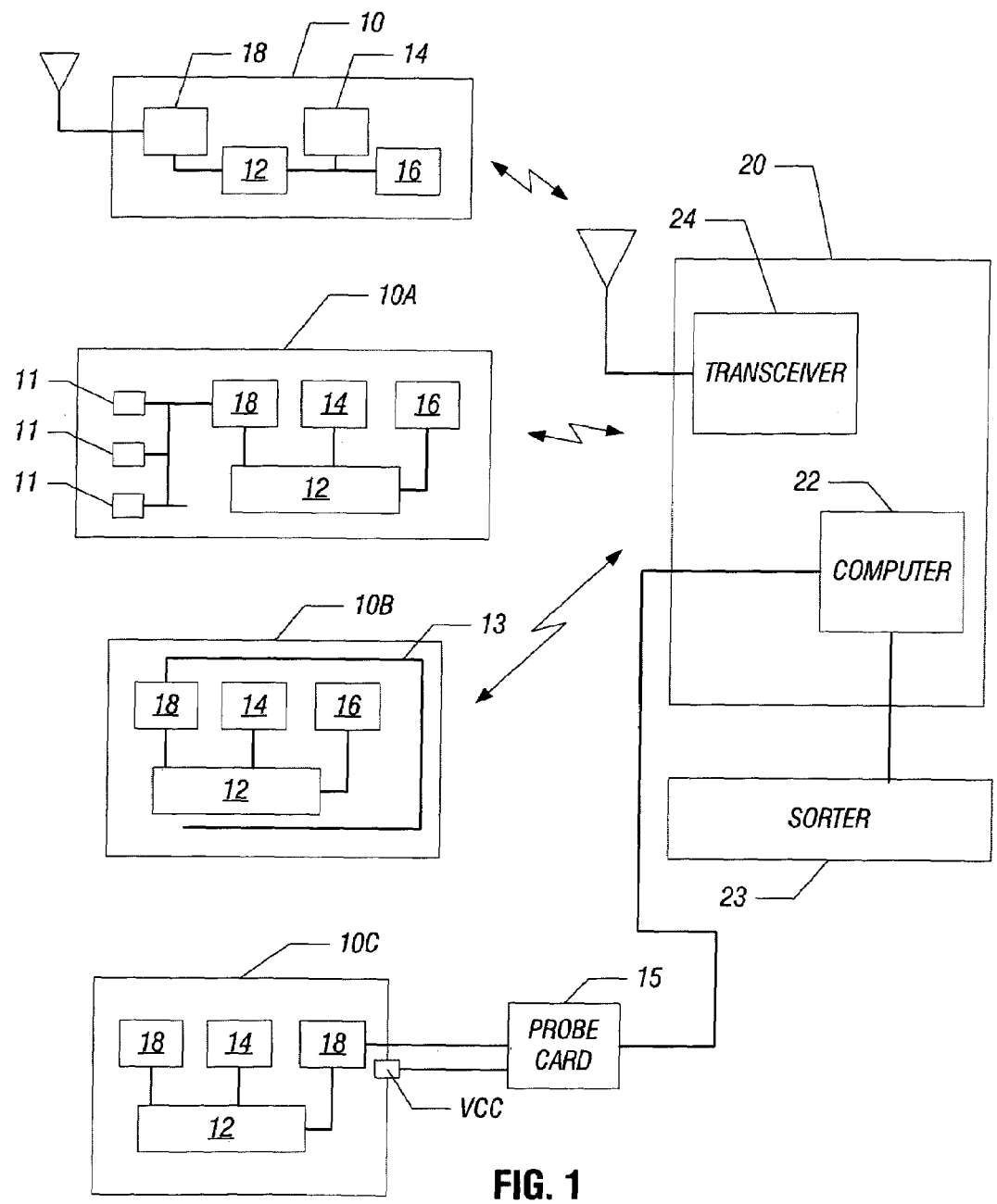
FIG. 1 is a block diagram of an exemplary system for testing semiconductor devices in wireless communication devices.

FIG. 1 shows one embodiment of a system for testing memory devices in parallel before they are soldered or electrically connected to a printed circuit board of a wireless device such as a cellular telephone, walkie-talkie, or a wireless handheld computer. A plurality of wireless devices 10 is positioned near a tester 20. Each of the wireless devices 10 includes a processor 12 connected to a volatile memory such as RAM 14, a non-volatile memory such as flash memory 16, and a wireless transceiver or radio 18. The transceiver 18 can be a Bluetooth™ transceiver/radio or can be a multi-mode transceiver as detailed below.

In the Bluetooth™ embodiment 10A, the transceiver/radio 18 does not need an antenna for proximity transmission. This embodiment uses one or more output pads 11 that operate as a small patch antenna. Even though this is an inefficient way to receive the RF signal from a master wireless transceiver 24 controlled by the tester 20, by tying several pads 11 together, enough spatial diversity can be obtained to get a clean signal. Since Bluetooth power output can be increased up to a watt, a Bluetooth™ transmitter can program devices even a few meters away using the pad patch antennas. Thus, the tester 20 can communicate with the devices 10 without requiring an antenna to be directly connected to the transceiver/radio 18 simply by being positioned near the devices. In addition to using pads as an array of patch antennas, dedicated metal film lines on the device can be used. For instance, U.S. Pat. No. 5,381,157 to Shiga entitled "Monolithic microwave integrated circuit receiving device having a space between antenna element and substrate" uses a metal film constituting patch antennas about which are antenna elements of the planar antenna is also formed on the surface and is connected to circuit components by a first layer-metal line. The entire backside of the Shiga substrate is covered by a metal layer acting as a grounding conductor and connected to the first layer-metal line suitably by a via hole. The Shiga patch antennas have an air bridge structure as the metal film constituting the patch antennas is formed with a space above the surface of the substrate.

In another embodiment 10B, a power metal line 13 inside the device 10B is used as an antenna. Since the circuit power is very low, the RF signal is superimposed onto the power supply network. Alternately, the antenna can be attached by a probe-card 15 during testing of another embodiment 10C. The probecard 15 applies power to one pad. Alternately, in embodiment 10D, the wafer for the devices can have one of its metallization layers extend such that all dies on the wafer are connected so only one connection to the wafer from an external antenna is necessary.

When power is applied, the device 10 wakes up, a startup program is loaded from the on-board read only memory (ROM), the radio 18 turns on, the necessary firmware is downloaded from the tester 20. Once the FLASH memory has been tested, a test program is uploaded to the FLASH memory and this program is used to test the functionality of the rest of the device 10. The test software is downloaded onto the chip where it performs a battery of tests coordinated by the on-board microprocessor. The system does not require special probecards, complex test electronics, or expensive test equipment.

The tester 20 can be a computer 22 having a suitable test program stored in its memory or data storage unit. The computer 22 controls a wafer sorter 23. To perform the test, a wafer is positioned in a wafer sort prober such that the power and ground bonding pads of a particular die are contacted by corresponding power and ground metal probes or connections. The tester 20 issues a series of wireless commands to cause the dies to be electrically tested for DC parameters and functionality. The actual electrical testing is directed by each processor of the device 10, as discussed in more detail below. Further, all devices are tested in parallel. A battery of tests and characterization are performed, and after all tests of all dies on a particular wafer have been completed, the tester 20 rejects bad devices and marks good devices for subsequent packaging/production. The tester 20 then loads the next wafer for testing.

The computer 22 is connected to the master wireless transceiver 24 that communicates with the wireless transceiver 18 on all wireless devices 10. In this manner, the computer 22 can instruct all wireless devices 10 to enter a test mode using a single command. Further, the computer 22 can selectively address each wireless device 10 using a unique identifier to query and receive test results. The computer 22 performs failure analysis for such as data pattern that caused the failure, the addresses of failed blocks, and the number of retries with respect to the addresses of the flash memory under test, among. The results of the flash memory test can be displayed on the computer 22 with relevant flash memory testing statistics.

In one embodiment, the computer 22, through the master transceiver 24, can program up to six slaves on a Bluetooth piconet. In another embodiment, the computer 22 expands the piconet into a scatternet to control about one hundred devices 10. In one embodiment, a Bluetooth 'broadcast' mode is used to beam a single message to all devices within a scatternet at approximately 1 Mbit/sec. Therefore, all devices can be programmed in the time it normally takes to test one device.

In yet another embodiment, the devices 10 must be programmed with the correct software once they have been tested. In this embodiment, the test programs are deleted from the FLASH memory and operating software is downloaded using the Bluetooth broadcast capability.

Figure 2:
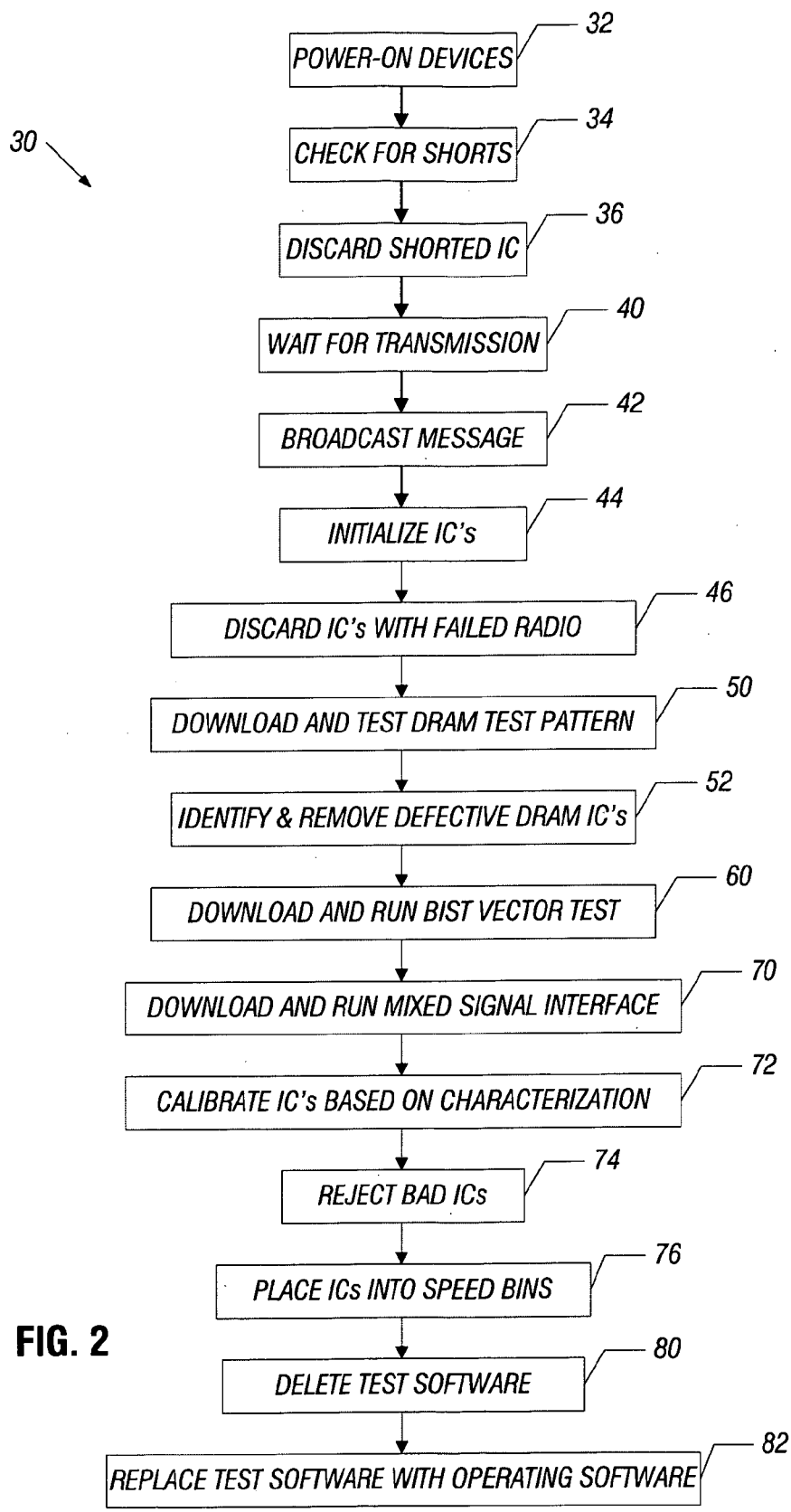
FIG. 2 is an exemplary flowchart illustrating a process for testing the semiconductor devices in the wireless communication devices of FIG. 1.

FIG. 2 shows an exemplary process 30 executed by the computer 22 of the tester 20. First, the process 30 applies power to all devices through their power/ground pins (step 32). The process measures current between ground and power pins to do a rough check for shorts (step 34). In one implementation, pads are tested for ground shorts by measuring current flow across the pad to ensure there are no internal shorts. If shorts exist, the process discards the bad devices (step 36). Since only these two pins are used, there is no need for probecards and test equipment, and the devices only need gross alignment as to these two pins.

Next, after components in the device, including the on-chip radio, have powered on, the process 30 enters a wait loop and waits for a transmission (step 40). The process then broadcasts a first message using the current transmission protocol, for example the Bluetooth protocol (step 42). The process 30 sends a command to initialize the wireless devices 10 to place the devices 10 into a known state and to request each wireless device 10 to identify itself using a unique identifier (step 44). All devices with working radios respond in turn—this step quickly eliminates chips with defective radios components (step 46).

Next, the computer 22 downloads a test pattern into the DRAM and executes the test pattern to eliminate devices with bad RAM (step 50). To minimize the risk of corruption, the flash memory test program downloaded to the device 10 can be verified using suitable techniques such as cyclic redundancy code (CRC) test. In one embodiment, the memory test routine supplies the test data to the DRAM under test to write the test data in a specified address and compares the data in the specified address with the expected data to determine whether that particular memory location works properly. A "walking 1's test" can be used where a single data bit is set to 1 and "walked" through the entire data word. In this embodiment, the number of data values to test is the same as the width of the data bus. This reduces the number of test patterns from 2n to n, where n is the width of the data bus. The test can also check for aliasing to find single-bit address failures such as stuck-high, stuck-low, and shorted pins. The test can also write and verify every memory location twice. A first data value is used for the first pass, and the first data value is inverted during the second pass. A simple example is an "increment test" which is easy to compute. In case where the data writing is not successful, the write operation is repeated until the test data is correctly stored in the address or the predetermined maximum number of times of the write operation is reached. The number of times required for the data is recorded for each address and displayed relative to the physical image of the flash memory under test. The process 30 then queries and identifies the status of the DRAM test in all devices being tested and each device 10 with a defective DRAM is marked as defective (step 52).

Next, one or more built-in-self-test (BIST) vectors are downloaded into the DRAM, and a full test is run to verify the functionality of the microprocessor, the SRAM, the FLASH memory and supporting circuits (step 60). For component level isolation of fault, a serial signature technique is used. Alternatively, for fault detection only, the parallel technique is used. A test input pattern is given to the device 10 that is under test. The device 10 provides test outputs and a signature of the test can be stored in a portion of the FLASH memory. The signature and test outputs are compared with expected values. Based on the comparison, the device 10 is analyzed for proper operation.

Next, the mixed signal interface is tested (step 70). The mixed signal interface can be tested in accordance with the teaching of a co-pending, commonly owned application entitled "SYSTEMS AND METHODS FOR SELF-CALIBRATION", filed concurrently herewith and having application Ser. No. 09/930,828, the content of which is incorporated-by-reference herewith. As taught therein, the chip has hot-electron sensors (deep well diodes), hot electron generators (small ring oscillators), temperature sensors (simple diodes with metallization to screen out the light), and heaters (simple polysilicon resistors placed over a diode and transistors). A high precision analog to digital converter (in one implementation, a 12 bit delta-sigma ADC) captures calibration data based in part on voltage variations or temperature variations, among others, and stores the calibration data in the embedded memory for subsequent processing.

In one embodiment, the process performs parametric characterization of the maximum voltage of the programmed data or the minimum voltage of the erased data stored in the memory cells. In this characterization, the tester 20 supplies the supply voltage source at various incremental steps for finding the maximum supply voltage for programmed data or the minimum supply voltage for erased data, the data stored inside the flash memory being tested. At each voltage step, the address space of the memory cells 10 is stepped through to read the data. The test stops if any data read "failed". A "failed" reading indicates that the current supply voltage level is the maximum voltage for all programmed data stored in the memory array or the minimum voltage for all erased data stored in the memory array.

Other wafer sort tests can be performed. For example, as discussed in U.S. Pat. No. 5,751,633, the major tests performed in wafer sort are the tests referred to as DC parametrics test for each cell which include testing for dc continuity, shorts, leakage current tests, etc., the programmability of each cell, the erasability of each cell, and the ac functionality of each cell. If these tests identify a defective cell, the process 30 determines whether there is an available redundancy with which the defective cell can be replaced. If there is an available redundancy the defect is corrected by replacing the column containing the defective cell. The correction is done by disconnecting the defective column through repair circuitry and connecting the redundancy column with the repair circuitry. If there isn't an available redundancy to replace the defective cell the device is marked for discard.

Following packaging, another test is performed upon the integrated circuit. This test may include verification of tests performed previously during wafer sort, as well as more exhaustive functional testing, such as testing of the IC under hot and cold temperature conditions.

The processor processes the calibration data and derives calibration parameters that are then stored in part of the FLASH memory (step 72). If the results of the calibration tests are outside of a predetermined range, the device is rejected (step 74). Alternatively, the device can be graded for a particular speed bin, and the speed bin information can be saved on the FLASH memory so the parts can be easily classified once the chips are assembled (step 76).

Once the tests are complete, the test program is erased from the FLASH, so the part has no test overhead in terms of the necessary hardware and/or software (step 80). Additional, software required for operating the device is downloaded from the computer 22 and can overwrite the space previously used for the test program (step 82).

Figure 3:
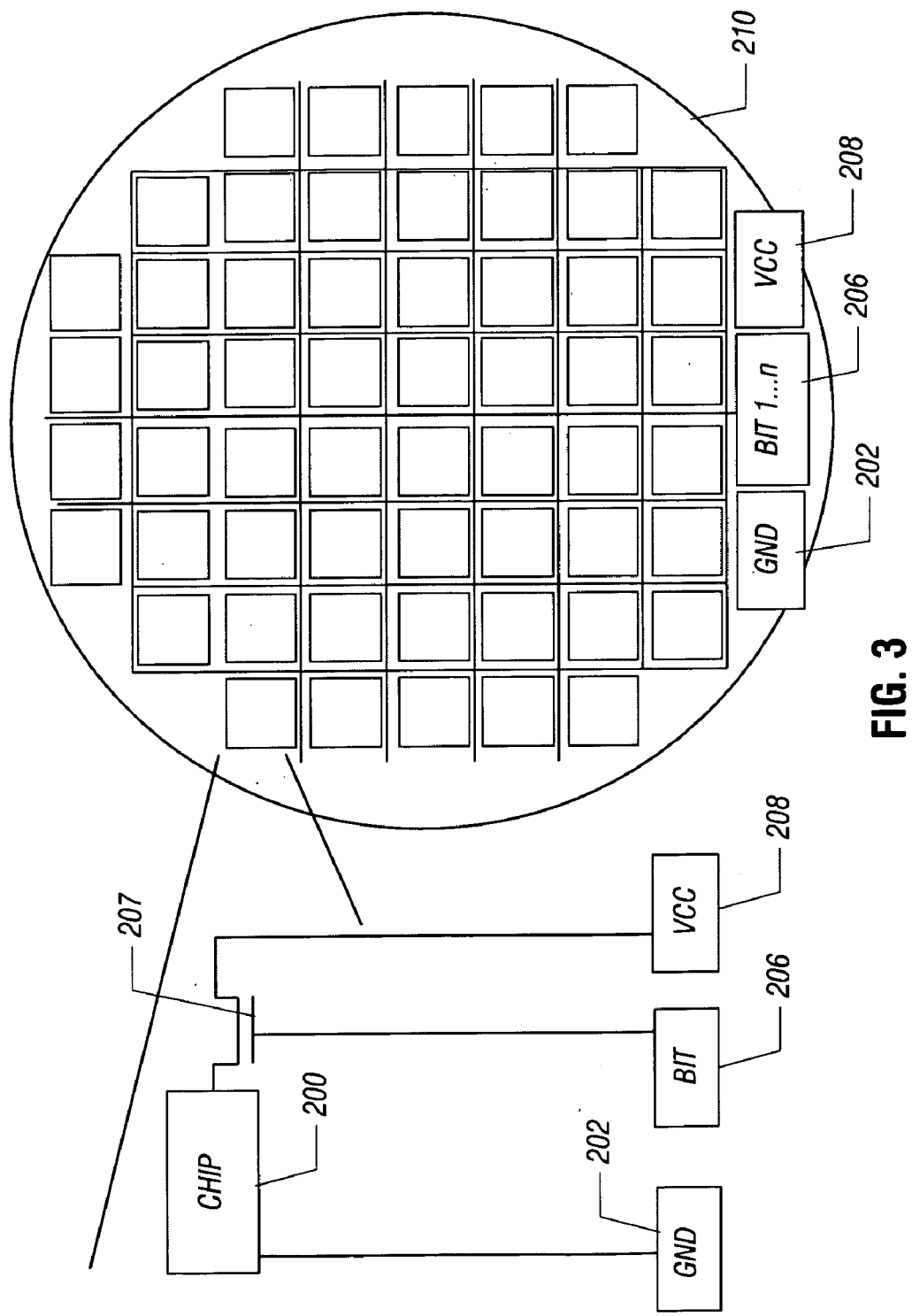
FIG. 3 shows one implementation that avoids the need to step from one die to another die on a wafer.

FIG. 3 shows one implementation that avoids the need to step from one die to another die on a wafer 210 that is being tested. In this implementation, a power line connecting to a power pad 208 and a ground line connecting to a ground pad 202 for each chip are connected to metal lines running through the length and width of the wafer, with additional switch transistors 207 added to each chip to switch the chip on and off. In this implementation, the testing is not longer done on a die-by-die method, but rather on a wafer-by-wafer method. The embodiment of FIG. 3A is advantageous in that there is no need to step from die to die and thus the complexity of the test equipment can be reduced.

Figure 4:
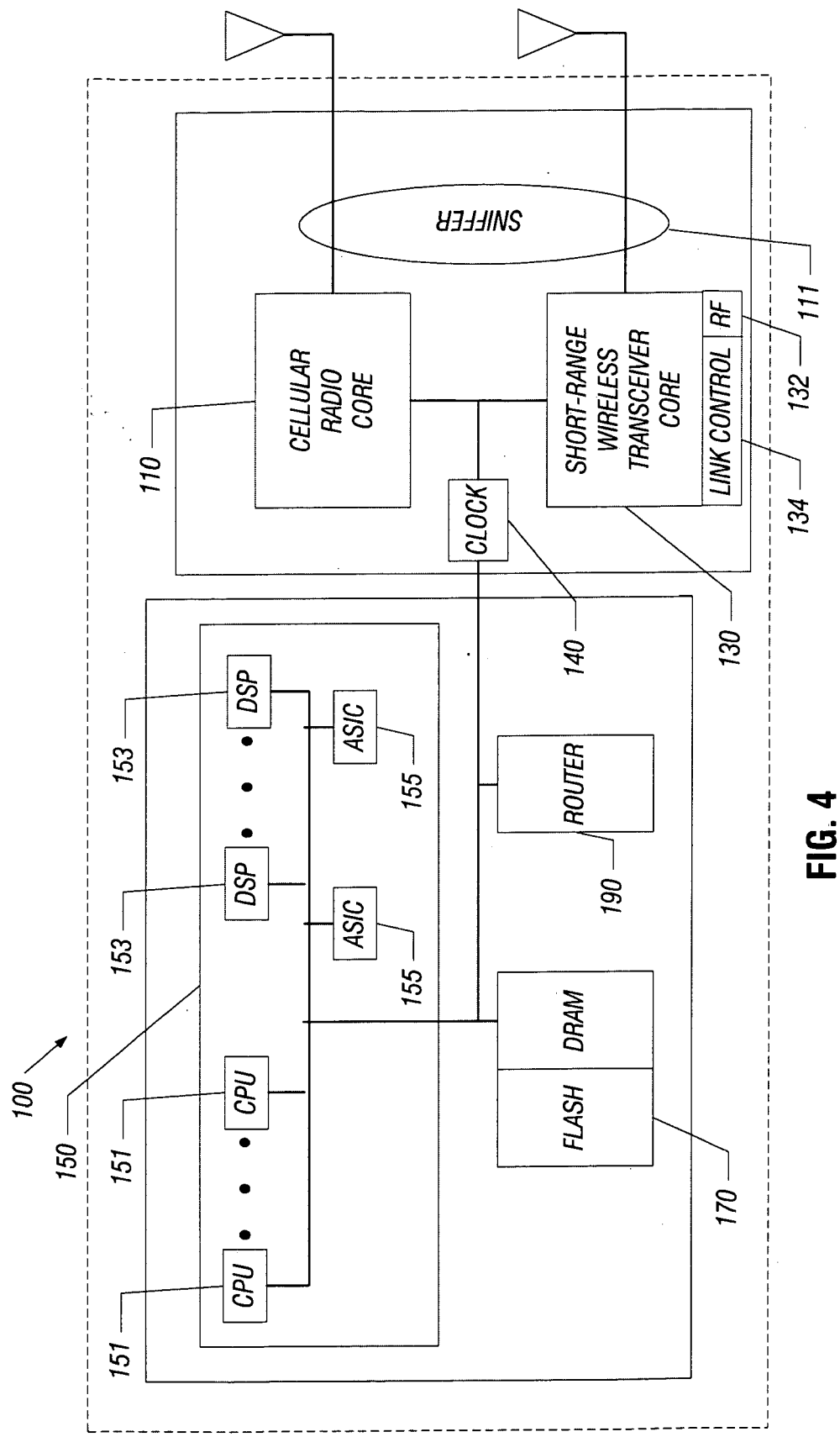
FIG. 4 is a block diagram of a single chip wireless communications integrated circuit.

FIG. 4 shows a block diagram of a multi-mode wireless communicator device 100 fabricated on a single silicon integrated chip. In one implementation, the device 100 is an integrated CMOS device with radio frequency (RF) circuits, including a cellular radio core 110, a short-range wireless transceiver core 130, and a sniffer 111, along side digital circuits, including a reconfigurable processor core 150, a high-density memory array core 170, and a router 190. The high-density memory array core 170 can include various memory technologies such as flash memory and dynamic random access memory (DRAM), among others, on different portions of the memory array core. The flash memory or the DRAM includes a main array section and a redundancy array section. The redundancy array section is a section comprising cells that are identical to the cells in the main array section and are used to replace defective cells identified in the main array during wafer sort. The redundancy cells are also manufactured in columns 8 bits wide and the same length as the main array columns. The number of redundancy columns included in the die depends upon the number of defective cells the manufacturer, through experience and statistical analysis conducted for each manufacturing process predicts will be needed to replace defective die during wafer sort. As can be appreciated, the more redundancy cells that are available will increase product yield, however, there is a point of diminishing returns because the die would have to be larger, and thus more costly to manufacture, to accommodate a larger number of redundancy cells.

The reconfigurable processor core 150 can include one or more processors 151 such as MIPS processors and/or one or more digital signal processors (DSPs) 153, among others. The reconfigurable processor core 150 has a bank of efficient processors 151 and a bank of DSPs 153 with embedded functions. These processors 151 and 153 can be configured to operate optimally on specific problems. For example, the bank of DSPs 153 can be optimized to handle discrete cosine transforms (DCTs) or Viterbi encodings, among others. Additionally, dedicated hardware 155 can be provided to handle specific algorithms in silicon more efficiently than the programmable processors 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

One exemplary processor embedded in the multi-processor core 150 includes a register bank, a multiplier, a barrel shifter, an arithmetic logic unit (ALU) and a write data register. The exemplary processor can handle DSP functions by having a multiply-accumulate (MAC) unit in parallel with the ALU. Embodiments of the processor can rapidly execute multiply-accumulate (MAC) and add-compare-subtract (ACS) instructions in either scalar or vector mode.

Other parts of the exemplary processor include an instruction pipeline, a multiplexer, one or more instruction decoders, and a read data register. A program counter (PC) register addresses the memory system 170. A program counter controller serves to increment the program counter value within the program counter register as each instruction is executed and a new instruction must be fetched for the instruction pipeline. Also, when a branch instruction is executed, the target address of the branch instruction is loaded into the program counter by the program counter controller. The processor core 150 incorporates data pathways between the various functional units. The lines of the data pathways may be synchronously used for writing information into the core 150, or for reading information from the core 150. Strobe lines can be used for this purpose.

In operation, instructions within the instruction pipeline are decoded by one or more of the instruction decoders to produce various core control signals that are passed to the different functional elements of the processor core 150. In response to these core control signals, the different portions of the processor core conduct processing operations, such as multiplication, addition, subtraction and logical operations. The register bank includes a current programming status register (CPSR) and a saved programming status register (SPSR). The current programming status register holds various condition and status flags for the processor core 150. These flags may include processing mode flags (e.g. system mode, user mode, memory abort mode, etc.) as well as flags indicating the occurrence of zero results in arithmetic operations, carries and the like.

Through the router 190, the multi-mode wireless communicator device 100 can detect and communicate with any wireless system it encounters at a given frequency. The router 190 performs the switch in real time through an engine that keeps track of the addresses of where the packets are going. The router 190 can send packets in parallel through two or more separate pathways. For example, if a Bluetooth™ connection is established, the router 190 knows which address it is looking at and will be able to immediately route packets using another connection standard. In doing this operation, the router 190 working with the RF sniffer 111 periodically scans its radio environment ('ping') to decide on optimal transmission medium. The router 190 can send some packets in parallel through both the primary and secondary communication channel to make sure some of the packets arrive at their destinations.

The reconfigurable processor core 150 controls the cellular radio core 110 and the short-range wireless transceiver core 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell phone core 110 provides wide area network (WAN) access, while the short-range wireless transceiver core 130 supports local area network (LAN) access. The reconfigurable processor core 150 has embedded read-only-memory (ROM) containing software such as IEEE802.11, GSM, GPRS, Edge, and/or Bluetooth™ protocol software, among others.

In one embodiment, the cellular radio core 110 includes a transmitter/receiver section that is connected to an off-chip antenna (not shown). The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of transmitter/receiver section 112, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

Turning now to the short-range wireless transceiver core 130, the short-range wireless transceiver core 130 contains a radio frequency (RF) modem core 132 that communicates with a link controller core 134. The processor core 150 controls the link controller core 134. In one embodiment, the RF modem core 132 has a direct-conversion radio architecture with integrated VCO and frequency synthesizer. The RF-unit 132 includes an RF receiver connected to an analog-digital converter (ADC), which in turn is connected to a modem 116 performing digital modulation, channel filtering, AFC, symbol timing recovery, and bit slicing operations. For transmission, the modem is connected to a digital to analog converter (DAC) that in turn drives an RF transmitter.

The link controller core 134 provides link control function and can be implemented in hardware or in firmware. One embodiment of the core 134 is compliant with the Bluetooth™ specification and processes Bluetooth™ packet types. For header creation, the link controller core 134 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

The RF transmitter can use one or more output pads 191 as an antenna to avoid the need an antenna for proximity transmission. Even though this is an inefficient way to receive the RF signal from a master wireless transceiver 24 controlled by the tester 20, by tying several pads together, enough spatial diversity can be obtained to get a clean signal. Since Bluetooth power output can be increased up to a watt, a Bluetooth™ transmitter can program devices even a few meters away using the pad patch antennas. In this manner, the tester 20 can communicate with the devices 100 without requiring an antenna to be directly connected to the transceiver/radio simply by being positioned near the devices.

In another embodiment, a power metal line 193 inside the device 100 is used as an antenna. Since the circuit power is very low, the RF signal is superimposed onto the power supply network. Alternately, the antenna can be an external antenna supplied by a probe-card 195 deployed during testing of the device 100. The probecard 195 applies power to one pad.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language or microcode if desired; and in any case, the language can be a compiled or interpreted language. Suitable processors include, by way of example, both general and special purpose microprocessors. Generally, a processor will receive initial instructions and data from a read-only memory and/or a random access memory. This type of memory can be used to power-up and program the processor to receive specific radio-frequency instruction. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method comprising:
wirelessly receiving a single test command on a plurality of wireless devices formed on a wafer via radio frequency circuitry of each of the plurality of wireless devices operable in a test mode and normal operation; and
simultaneously testing the plurality of wireless devices in response to receiving the single test command.

2. The method of claim 1, further comprising switching all of the plurality of wireless devices on to wirelessly receive the single test command.

3. The method of claim 2, further comprising switching on a transistor coupled to each of the plurality of wireless devices to switch all of the plurality of wireless devices on.

4. The method of claim 1, further comprising wirelessly receiving the single test command without an antenna coupled to the plurality of wireless devices.

5. The method of claim 4, further comprising wirelessly receiving the single test command via one or more pads formed on each of the plurality of wireless devices.

6. The method of claim 4, further comprising wirelessly receiving the single test command via a power line formed on each of the plurality of wireless devices.

7. The method of claim 1, further comprising communicating with individual ones of the plurality of wireless devices regarding test results.

8. The method of claim 7, further comprising communicating with the individual ones of the plurality of wireless devices based on a unique identifier.

9. The method of claim 1, further comprising eliminating any of the plurality of the wireless devices that does not identify itself in response to the single test command.

10. The method of claim 9, further comprising next eliminating any of the plurality of wireless devices that fail a volatile memory test.

11. The method of claim 10, further comprising next eliminating any of the plurality of wireless devices that fail a digital circuitry test.

12. The method of claim 11, further comprising next eliminating any of the plurality of wireless devices that fail a mixed signal interface test.

13. A system comprising:
a test unit to issue a single test command for transmission to a plurality of wireless devices formed on a wafer, the single test command to cause testing of the plurality of wireless devices via radio frequency circuitry of each of the plurality of wireless devices operable in a test mode and normal operation of the wireless device in parallel; and
an antenna coupled to the test unit to wirelessly transmit the single test command for receipt by the plurality of wireless devices.

14. The system of claim 13, further comprising a wafer sorter coupled to the test unit.

15. The system of claim 13, wherein the test unit is configured to selectively address selected ones of the plurality of wireless devices to receive test results therefrom.

16. The system of claim 15, wherein the system is configured to provide power in parallel to the plurality of wireless devices via a single power pad on the wafer.

17. An apparatus comprising:
a wafer having a plurality of wireless devices formed thereon, wherein each of the plurality of wireless devices comprises an analog portion including a cellular radio core and a short-range wireless transceiver core coupled to the cellular radio core and a digital portion including a processor coupled to the cellular radio core and the short-range wireless transceiver core to handle a plurality of wireless communication protocols and a memory coupled to the processor, the wafer comprising:
a power pad coupled to each of the plurality of wireless devices to provide a power supply voltage thereto during a test operation; and
a ground pad coupled to each of the plurality of wireless devices to provide a reference voltage thereto during the test operation.

18. The apparatus of claim 17, further comprising a plurality of transistors, each coupled to provide the power supply voltage to a corresponding one of the plurality of wireless devices under control of a voltage on a bit pad.

19. The apparatus of claim 17, wherein each of the wireless devices is configured to directly receive a test command from a tester wirelessly.

20. The apparatus of claim 17, wherein the short-range wireless transceiver core is configured to wirelessly receive signals from a tester without a dedicated antenna.

* * * * *